US012766721B2

(12) United States Patent
Kimoto

(10) Patent No.: US 12,766,721 B2
(45) Date of Patent: Oct. 20, 2026

(54) ROBOT SIMULATION DEVICE

(71) Applicant: FANUC CORPORATION, Yamanashi (JP)

(72) Inventor: Yuuki Kimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 18/684,179

(22) PCT Filed: Sep. 29, 2021

(86) PCT No.: PCT/JP2021/035972

§ 371 (c)(1),
(2) Date: Feb. 16, 2024

(87) PCT Pub. No.: WO2023/053294

PCT Pub. Date: Apr. 6, 2023

(65) Prior Publication Data

US 2024/0351208 A1 Oct. 24, 2024

(51) Int. Cl.
*B25J 9/16* (2006.01)
*B25J 19/02* (2006.01)

(52) U.S. Cl.
CPC ............. *B25J 9/1671* (2013.01); *B25J 9/163* (2013.01); *B25J 19/026* (2013.01)

(58) Field of Classification Search
CPC ......... B25J 9/1671; B25J 9/163; B25J 19/026
See application file for complete search history.

(56) References Cited

U.S. PATENT DOCUMENTS

2003/0083784 A1* 5/2003 Nagai .................... B25J 9/1689 700/245
2006/0184275 A1* 8/2006 Hosokawa ............. B25J 9/1666 700/245

FOREIGN PATENT DOCUMENTS

| | | | |
|---|---|---|---|
| CN | 105835064 | A | 8/2016 |
| DE | 102018220695 | A1 | 6/2019 |
| DE | 102016008137 | B4 | 1/2020 |
| EP | 2926947 | A1 | 10/2015 |
| JP | H11-133848 | A | 5/1999 |
| JP | 2004-178447 | A | 6/2004 |
| JP | 2005-316937 | A | 11/2005 |
| JP | 2013-025776 | A | 2/2013 |
| JP | 2016-005856 | A | 1/2016 |
| JP | 2017-217738 | A | 12/2017 |

* cited by examiner

*Primary Examiner* — Basil T. Jos
(74) *Attorney, Agent, or Firm* — HAUPTMAN HAM, LLP

(57) ABSTRACT

This robot simulation device is provided with an operation simulation execution unit that executes an operation simulation of a robot in accordance with an operation program, and a driving sound generation unit that simulates and generates a driving sound according to an operation state of the robot in the operation simulation, on the basis of driving sound data obtained by recording the driving sound of an actual robot.

9 Claims, 8 Drawing Sheets

ROBOT SIMULATION DEVICE

RELATED APPLICATIONS

The present application is a National Phase of International Application No. PCT/JP2021/035972 filed Sep. 29, 2021.

FIELD

The present invention relates to a robot simulation device.

BACKGROUND

Various types of simulation devices for simulating a motion of a robot or a mechanical device are widely used.

For example, PTL 1 describes, with regard to a training device that is applied to phenomenon understanding, operation training, and the like of a plant or a mechanical device, "The third memory 6 is a memory that as illustrated in FIG. 2C, stores an outline diagram and a component diagram of a machine, a valve, a pipe, and the like constituting a plant or a mechanical device, data about color, operating sound in various types of operation states, and the like, a piping diagram, and the like and is used by the image/operating sound generation device 5 to generate an image of the plant or the mechanical device viewed from a position and direction specified by a learner and an operating sound in an operation state of the plant or the mechanical device. The operating sound is, for example, a sound of equipment generated by rotation in the case of rotational equipment, such as a pump and a motor, or, in the case of a pipe or the like, a sound generated by water, steam, or the like flowing inside the pipe." (paragraph 0011).

PTL 2 describes, "The robot 11 includes a manipulator 21, a hand 22 attached to a tip of the manipulator 21, and a microphone 23 attached to the hand 22." (paragraph 0018), "The microphone 23 is attached to the hand 22 as an example of a site at which it is easy to input a sound (sound wave) related to work performed by the hand 22." (paragraph 0020), and "In the robot system 1 according to the present embodiment, by, for example, controlling the robot based on volume of sound without performing processing of Fourier transforming sound information and applying frequency analysis to the transformed information, it is possible to reduce processing time and a processing load." (paragraph 0034).

PTL 3 describes, with regard to an electric cutting tool for teaching, "At a position close to a processed object 11T, a microphone 22 that detects a cutting sound during cutting and polishing of the processed object 11T by the grindstone 12T is arranged and a detected sound detected by the microphone 22 is input to the recording device 20 via the signal line 23. The recording device 20 stores a sound frequency corresponding to a grindstone circumferential speed and a contact pressure measured by the force sensor 13 during cutting and polishing from a frequency level of a cutting sound sent from the signal line 23, based on the number R of rotations of the grindstone 12T." (paragraph 0023), "In the recording device 20, work teaching motion and the like of the above-described electric cutting tool 10T for teaching from start of work to completion of work when an experienced operator M processes the processed object 11T using the electric cutting tool 10T for teaching are stored and the stored work teaching motion and the like are used as work teaching data." (paragraph 0024), and "Since the grindstone 12R wears due to polishing and circumferential speed of the grindstone 12R changes, adjustment of the number of rotations of the grindstone 12R can be performed based on sound frequency data stored as the work teaching data 24." (paragraph 0032).

CITATION LIST

Patent Literature

[PTL 1] Japanese Unexamined Patent Publication (Kokai) No. H11-133848A

[PTL 2] Japanese Unexamined Patent Publication (Kokai) No. 2016-5856A

[PTL 3] Japanese Unexamined Patent Publication (Kokai) No. 2017-217738A

SUMMARY

Technical Problem

When performing teaching of a robot on a simulation device, an operator needs to determine whether a motion of the robot in a taught program is good or bad. In such a case, the determination is generally performed by visually checking a motion and a trajectory of the robot or by visualizing information about the amount of movement of each axis of a robot and speed, acceleration, jerk, torque, current, temperature, and the like of a motor and visually checking the information. In such a case of motion confirmation of a robot, when the robot is assumed to be a multi-axis robot, such as a six-axis robot, an operator needs to check various data for each of six axes. Therefore, it takes considerable time to carry out the motion confirmation work, thus imposing a heavy load on an operator in carrying out the motion confirmation work.

Solution to Problem

One aspect of the present disclosure is a robot simulation device including a motion simulation execution unit configured to execute a motion simulation of a robot in accordance with a motion program and a drive sound generation unit configured to simulate and generate, based on drive sound data that are acquired by recording a drive sound of an actual robot, a drive sound matching a motion state of the robot in the motion simulation.

Advantageous Effects of Invention

An operator who is proficient in teaching operations to an actual robot is able to determine whether a motion state of the robot is good or bad by listening to a drive sound matching a motion state of the robot. Therefore, according to the above-described configuration, time taken for confirmation work in a case in which an operator determines whether a motion of the robot performed by a taught program is good or bad is largely reduced and a load on the operator is reduced.

The object, characteristics, and advantages of the present invention as well as other objects, characteristics, and advantages will be further clarified from the detailed description of typical embodiments of the present invention illustrated in the accompanying drawings.

DESCRIPTION OF EMBODIMENTS

Figure 1:
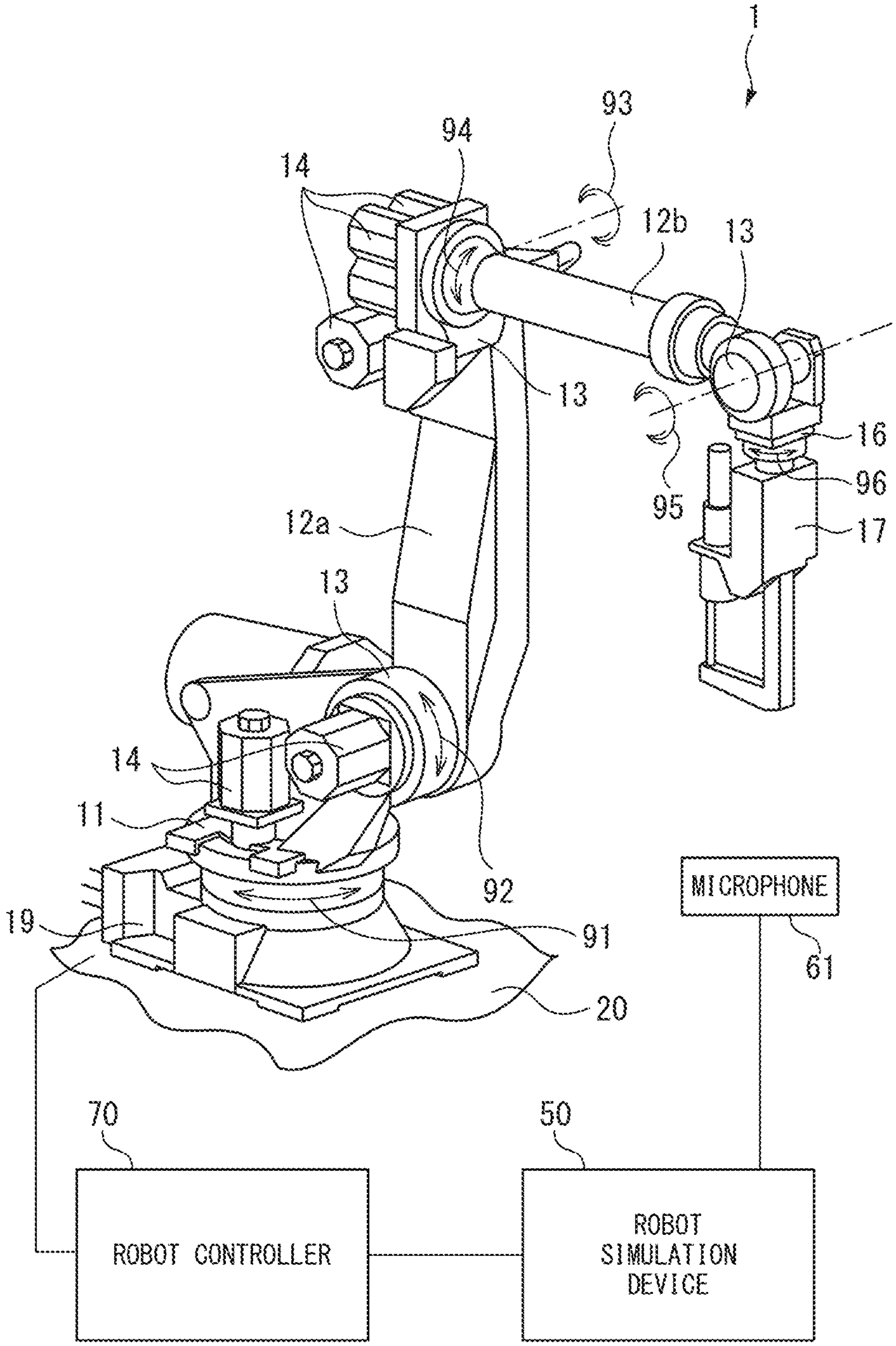
FIG. 1 illustrates a perspective view of an actual robot serving as a target of simulation performed by a robot simulation device and is also a diagram illustrating a system configuration including a robot controller and the robot simulation device.

An embodiment of the present disclosure will be described below with reference to the accompanying drawings. In the drawings that are referred to, the same constituents' components or functional components are given the same reference signs. To facilitate understanding, scales are appropriately changed in the drawings. In addition, modes illustrated in the drawings are only an example for embodying the present invention, and the present invention is not limited to the illustrated modes.

A robot simulation device 50 according to one embodiment (see FIGS. 1 to 3) will be described below. In FIG. 1, a perspective view of an actual robot 1 that is a target of simulation performed by the robot simulation device 50 is illustrated and a system configuration including a robot controller 70 and the robot simulation device 50 is also illustrated. In the present embodiment, it is assumed as an example that the robot 1 is a six-axis articulated robot. Another type of robot may be used as a target of simulation. The robot 1 is controlled by the robot controller 70. The robot simulation device 50 is connected to the robot controller 70 via, for example, a network. In this configuration, the robot controller 70 is capable of controlling the robot 1 in accordance with a motion program that is sent from the robot simulation device 50.

As will be described below in detail, the robot simulation device 50 has functions of performing a motion simulation of the robot 1 and further simulating (generating in a simulative manner) a drive sound of the robot 1. As illustrated in FIG. 1, the robot simulation device 50 also has a function of collecting a drive sound of the robot 1 via a microphone 61.

A configuration of the robot 1 will be described below. The robot 1 is a multi-axis robot including arms 12*a* and 12*b*, a wrist unit 16, and a plurality of joint units 13. To the wrist unit 16 of the robot 1, a work tool 17 serving as an end effector is attached. The robot 1 includes a motor 14 that drives a drive member in each of the joint units 13. By driving the motor 14 in each of the joint units 13 based on a position command, each of the arms 12*a* and 12*b* and the wrist unit 16 can be brought into a desired position and posture. The robot 1 also includes a base unit 19 that is fixed to a mounting surface 20 and a turning unit 11 that turns with respect to the base unit 19. In FIG. 1, rotational directions of the six axes (an axis J1, an axis J2, an axis J3, an axis J4, an axis J5, and an axis J6) are indicated by arrows 91, 92, 93, 94, 95, and 96, respectively.

Although in FIG. 1, the work tool 17 attached to the wrist unit 16 of the robot 1 is a welding gun to perform spot welding, without being limited thereto, various tools can be attached as the work tool according to work details.

Figure 2:
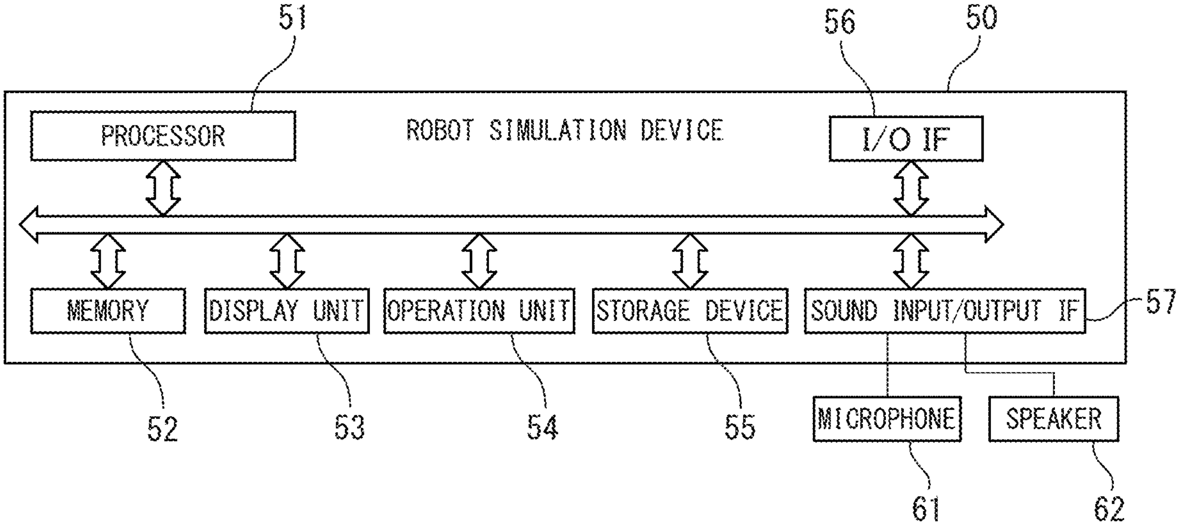
FIG. 2 is a diagram illustrating a hardware configuration example of the robot simulation device.

FIG. 2 is a diagram illustrating a hardware configuration example of the robot simulation device 50. As illustrated in FIG. 2, the robot simulation device 50 may have a configuration as a general computer in which a memory 52 (a ROM, a RAM, a non-volatile memory, and the like), a display unit 53, an operation unit 54 that is formed by an input device such as a keyboard (or software keys), a storage device 55 (an HDD or the like), an input/output interface 56, a sound input/output interface 57, and the like are connected to a processor 51 via a bus. To the sound input/output interface 57, the microphone 61 and a speaker 62 are connected. The sound input/output interface 57 has a function of capturing sound data via the microphone 61, a function of performing sound data processing, and a function of outputting sound data via the speaker 62. As the robot simulation device 50, various types of information processing device, such as a personal computer, a laptop computer, a tablet computer, and the like, can be used.

Figure 3:
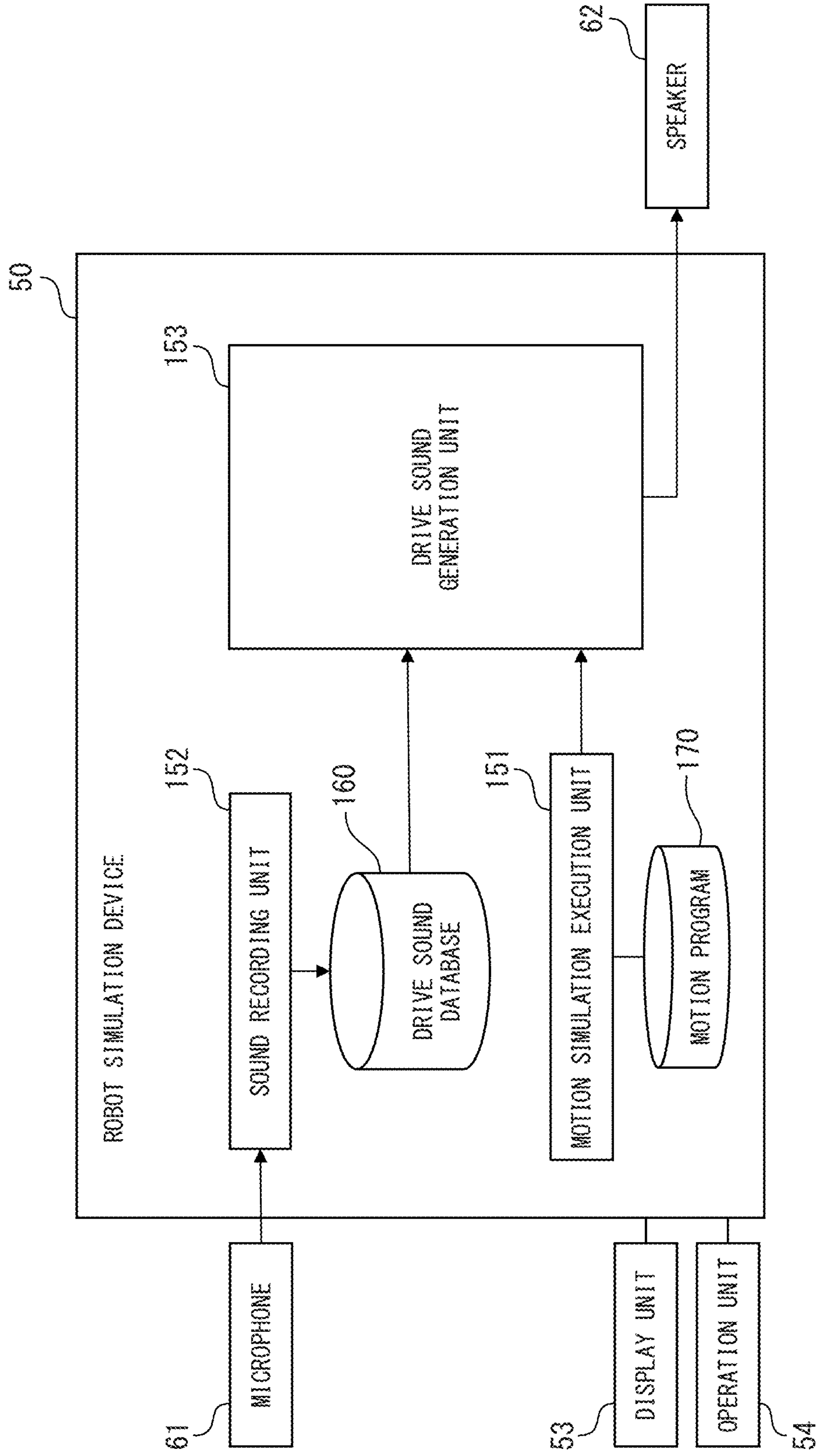
FIG. 3 is a functional block diagram of the robot simulation device.

FIG. 3 is a functional block diagram of the robot simulation device 50. As illustrated in FIG. 3, the robot simulation device 50 includes a motion simulation execution unit 151, a sound recording unit 152, and a drive sound generation unit 153.

The motion simulation execution unit 151 executes a motion simulation in which the robot 1 is caused to move in a simulative manner in accordance with a motion program 170. A state in which the robot 1 moves in a simulative manner is displayed on, for example, the display unit 53.

The sound recording unit 152 has functions of processing a sound signal that is input via the microphone 61 and putting the processed sound signal on record as sound data. The microphone 61 and the sound recording unit 152 are used to record and put on record a drive sound of each axis when the robot 1 is actually driven. Details of sound recording of a drive sound will be described later.

The drive sound generation unit 153 simulates and generates a drive sound matching a motion state of the robot 1 when a motion simulation of the robot 1 is executed by the motion simulation execution unit 151. A generated drive sound is output via the speaker 62.

A collection example of drive sounds of the actual robot 1 via the sound recording unit 152 will be described below. In this example, it is assumed that a main cause of a drive sound of the robot 1 is a motor and a speed reducer of each axis, and drive sound is considered to depend on the torque and rotational speed of the motor and the torque and rotational speed of the speed reducer.

Collection of drive sounds is performed, for example, by preparing a motion program that drives each axis and while changing a specification of speed (or a maximum speed) and a specification of acceleration in the motion program, putting on record a drive sound of each axis in conjunction with torque and rotational speed of a motor and torque and rotational speed of a speed reducer at the time of driving the axis. For example, with regard to the axis J1, the axis J1 is driven by a motion program that drives only the axis J1 at various speeds or the like and drive sounds are collected. It may be configured to execute the motion program while changing a posture, wrist load, and the like of the robot and collect drive sounds in order to increase the amount of data of drive sounds to be collected. When a drive sound of the robot 1 is collected, parameters representing a motion state of the robot 1 when the drive sound is recorded (for example, a torque and rotational speed of a motor and a torque and rotational speed of a speed reducer with respect to each axis) are acquired from the robot controller 70. Such an operation can be achieved by the robot simulation device 50 and the robot controller 70 operating in a cooperative manner. As an example, it may be configured such that generation of a command to drive the robot 1 in this case is performed in the sound recording unit 152, the generated command is sent to the robot controller 70, and the robot 1 is driven in accordance with the sent command.

With the above-described configuration, drive sounds of the robot 1 when torque of a motor, rotational speed of the motor, torque of a speed reducer, and rotational speed of the speed reducer are changed as parameters with respect to each axis can be put into a database. The drive sound data that are collected in this way are hereinafter also referred to as a drive sound database 160.

Figure 4:
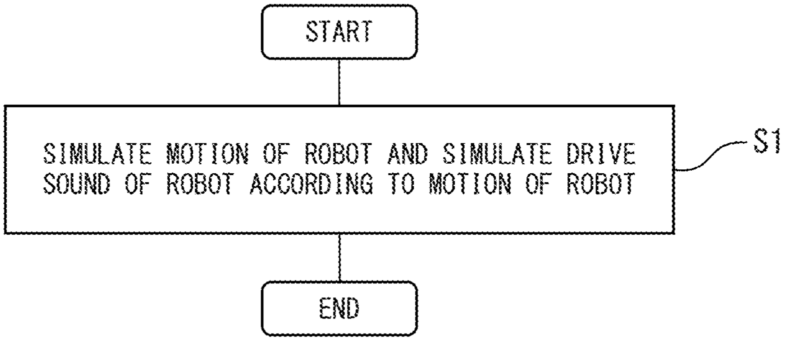
FIG. 4 is a basic flowchart illustrating drive sound generation processing at the time of motion simulation of the robot.

FIG. 4 is a basic flowchart illustrating drive sound generation processing at the time of motion simulation of the robot 1, the drive sound generation processing being executed by the robot simulation device 50. It is assumed that the motion simulation execution unit 151 has started a motion simulation of the robot 1 in accordance with a motion program in response to a predetermined user operation. The drive sound generation unit 153 acquires a motion state of the robot 1 under the motion simulation from the motion simulation execution unit 151 and simulates and generates a drive sound matching the motion state (step S1).

More specifically, the drive sound generation unit 153 acquires a torque and rotational speed of a motor and a torque and rotational speed of a speed reducer as parameters with respect to each axis of the robot 1 under the motion simulation from the motion simulation execution unit 151 and acquires a drive sound matching the parameters from the drive sound database 160 with respect to each axis. The drive sound generation unit 153 synthesizes drive sounds acquired with respect to the axes with one another and thereby generates a drive sound of the robot 1.

Figure 5:
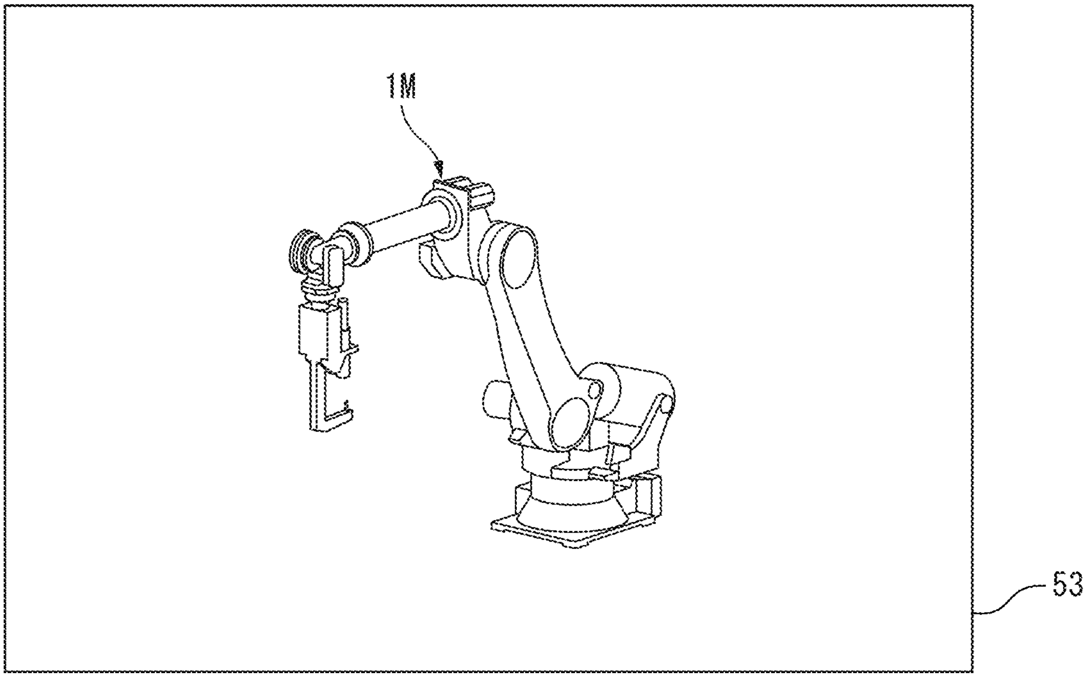
FIG. 5 is a diagram illustrating a scene of the motion simulation of the robot that is displayed on a display unit of the robot simulation device.

Through the above-described operation, a drive sound corresponding to a scene in the motion simulation of the robot 1 (robot model 1M) as illustrated in FIG. 5 as an example is output in conjunction with a simulated motion of the robot 1 (robot model 1M). An operator who is proficient in teaching operations to an actual robot is able to determine whether a motion state of the robot is good or bad by listening to a drive sound matching the motion state of the robot. Therefore, according to the above-described configuration, time taken for confirmation work in a scene in which an operator determines whether a motion of the robot performed by a taught program is good or bad is largely reduced, and the load on the operator also reduced.

It should be noted that with regard to timing at which a drive sound of the robot 1 is reproduced, not only a method of reproducing a drive sound in synchronization with movement of the robot 1 in the motion simulation but also a method of, after presenting a movement of the robot 1, reproducing a drive sound corresponding to the movement is conceivable.

Figure 6:
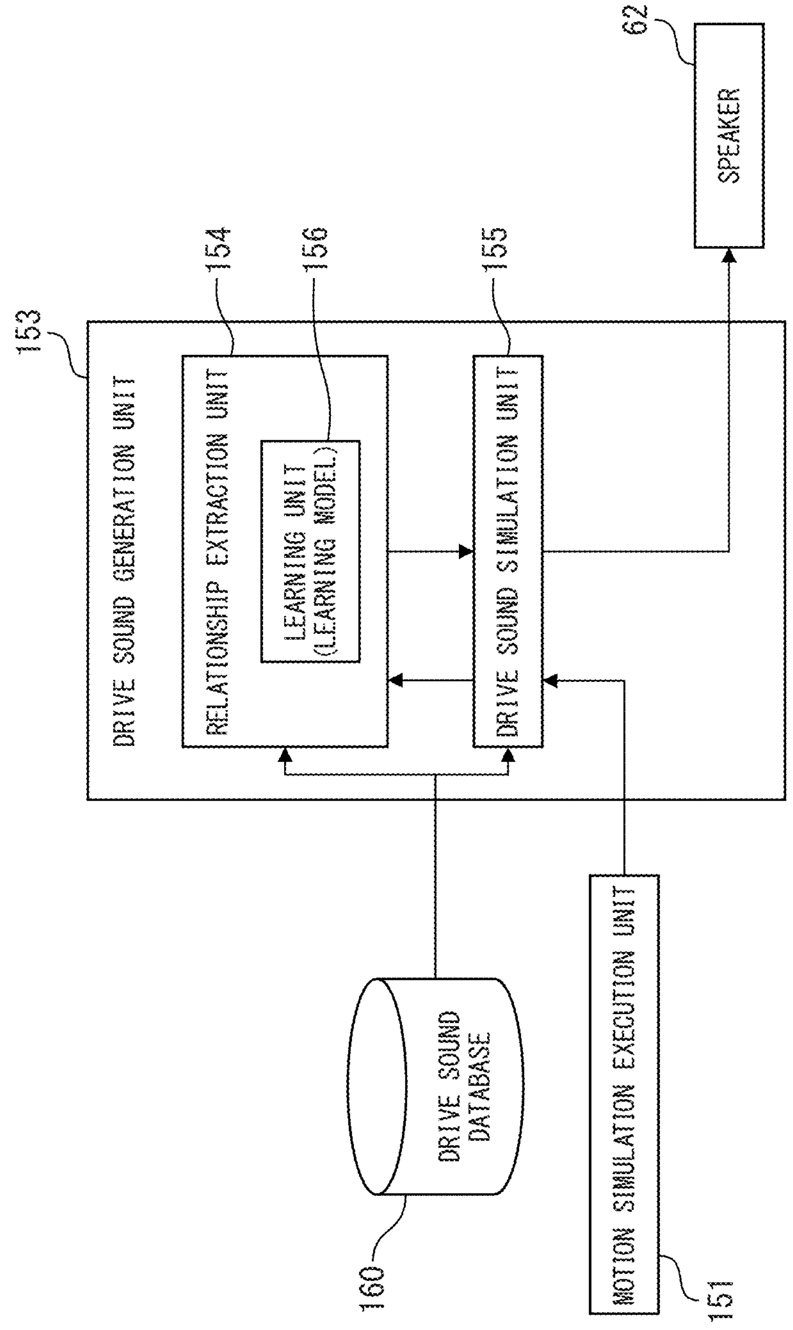
FIG. 6 is a functional block diagram illustrating a configuration example of a drive sound generation unit.

A specific configuration example of the drive sound generation unit 153 will be described below. FIG. 6 is a functional block diagram illustrating a configuration example of the drive sound generation unit 153 as an illustrative example. The drive sound generation unit 153 in the present example is configured to extract a relationship between parameters representing a motion state of the robot 1 and a drive sound and generate, based on the extracted relationship, a drive sound from a motion state of the robot 1 in the motion simulation.

As illustrated in FIG. 6, the drive sound generation unit 153 includes a relationship extraction unit 154 and a drive sound simulation unit 155.

The relationship extraction unit 154 has a function of extracting and retaining a relationship between a motion state of the robot 1 and drive sound data stored in the drive sound database 160. As an example, the relationship extraction unit 154 may include a learning unit 156 that learns a relationship between a motion state of the robot 1 and a drive sound and constructs a learning model.

The drive sound simulation unit 155 simulates and generates a drive sound matching a motion state of the robot 1, based on a relationship that the relationship extraction unit 154 retains, the drive sound database 160, and a motion state of each axis of the robot 1 that is acquired from the motion simulation execution unit 151. A generated drive sound of the robot 1 is output via the speaker 62.

It is assumed that as described above, the drive sound database 160 that associates predetermined parameters (torque of a motor, rotational speed of the motor, torque of a speed reducer, and rotational speed of the speed reducer) with a drive sound with respect to each axis is prepared by the sound recording unit 152. The relationship extraction unit 154 derives a relationship between the predetermined parameters (torque and rotational speed of a motor and torque and rotational speed of a speed reducer) and a drive sound of the robot 1.

Although various types of methods can be used as a method for calculating a relationship between the parameters and a drive sound, a method of calculating a relationship by machine learning will be described herein. In the present embodiment, the learning unit 156 of the relationship extraction unit 154 learns a relationship between parameters including torque of a motor, rotational speed of the motor, torque of a speed reducer, and rotational speed of the speed reducer and a drive sound with respect to each axis by machine learning and constructs a learning model.

Although various methods of machine learning are available, the methods, when roughly classified, includes, for example, "supervised learning", "unsupervised learning", and "reinforcement learning". Further, when such methods are to be achieved, a method referred to as "deep learning" can be used. In the present embodiment, "supervised learning" is applied to machine learning performed by the learning unit 156.

Figure 7:
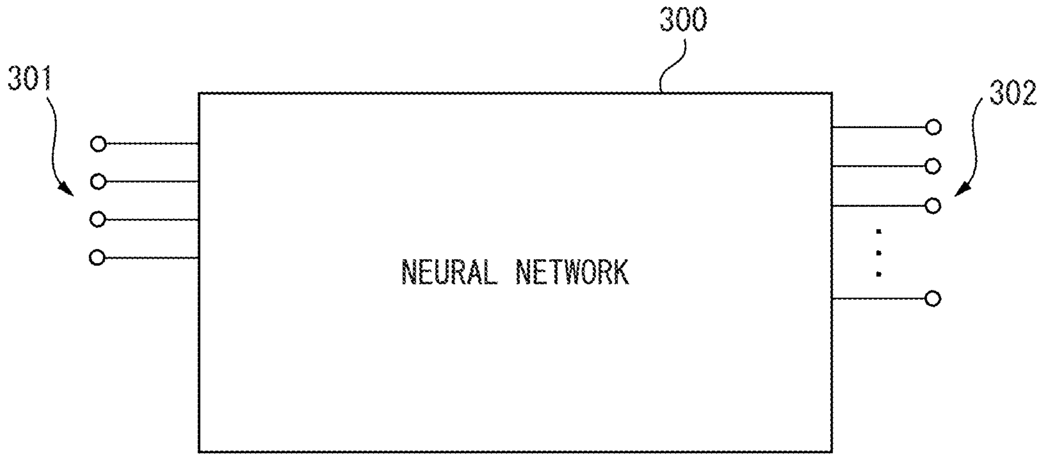
FIG. 7 is a diagram illustrating a configuration example of a learning unit.

A specific configuration and learning method of the learning unit 156 will be described below. As illustrated in FIG. 7, the learning unit 156 includes a neural network 300. By applying training data including input data (input parameters) and output data, the neural network 300 is caused to construct a learning model. In a process of performing learning, weighting applied to each neuron in the neural network 300 is learned by an error back-propagation method.

Through the above-described collection of drive sounds, predetermined parameters (torque of a motor, rotational speed of the motor, torque of a speed reducer, and rotational speed of the speed reducer) and a drive sound have been associated with each other. In this case, drive sounds are converted into sound pressure level data for each frequency component, which is calculable by dividing an audio frequency band into a predetermined number of components, by frequency analysis. Although in FIG. 7, one neural network 300 is illustrated, it may be configured such that a neural network 300 is prepared for each axis and a drive sound from each axis is learned by corresponding one of the neural networks 300.

A plurality of pieces of training data each of which includes predetermined parameters (in the above-described example, torque of a motor, rotational speed of the motor, torque of a speed reducer, and rotational speed of the speed reducer) as input data and a sound pressure level for each frequency component as output data are prepared, and the neural network 300 is trained using the plurality of pieces of training data. Through this operation, a learning model receiving predetermined parameters as input data and outputting a sound pressure level for each frequency component as output data is constructed.

When the learning model is constructed, the drive sound simulation unit 155 acquires predetermined parameters (in the above-described example, torque of a motor, rotational speed of the motor, torque of a speed reducer, and rotational speed of the speed reducer with respect to each axis) as a motion state of the robot 1 while the robot 1 is performing a simulated motion and inputs the acquired predetermined parameters to the trained neural network 300. Through this operation, a sound pressure level for each frequency component of a drive sound corresponding to the motion state of the robot 1 is output from the neural network 300. The drive sound simulation unit 155 acquires, with respect to each of all the axes of the robot 1, a sound pressure level for each frequency component corresponding to a motion state of the axis. The drive sound simulation unit 155 acquires a drive sound of the robot 1 corresponding to the above-described motion state by synthesizing sound pressure levels for respective frequency components with respect to each axis that are acquired in this way.

The synthesized drive sound is output via the speaker 62. The above-described operation causes a drive sound of the entire robot 1 corresponding to torque and rotational speed of a motor and torque and rotational speed of a speed reducer of each axis of the robot 1 while performing simulated operation to be output.

Figure 8:
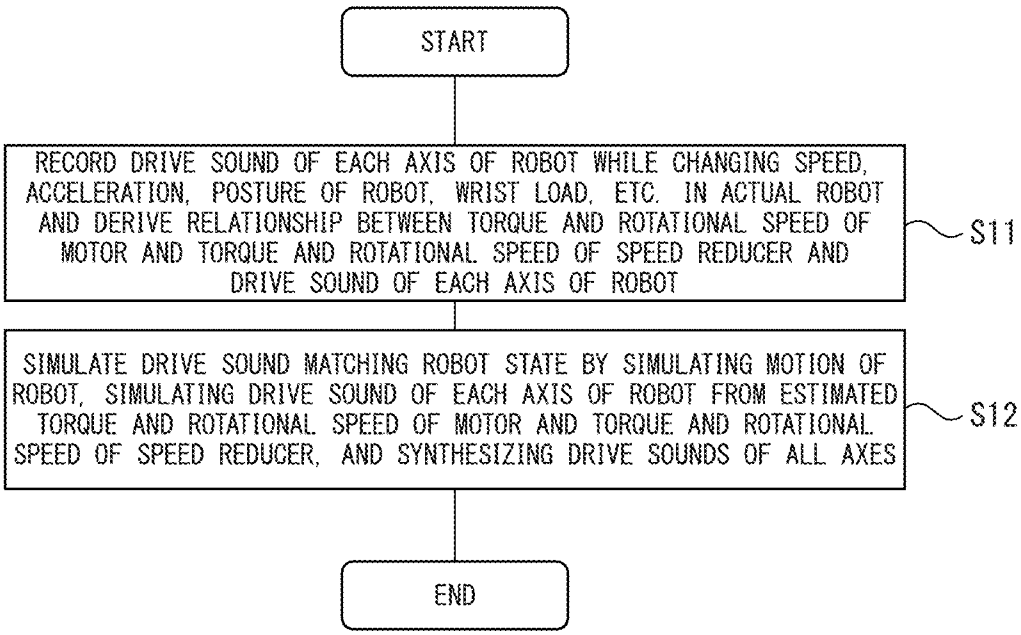
FIG. 8 is a flowchart illustrating the drive sound generation processing when the configuration illustrated in FIG. 6 is employed as a configuration of the drive sound generation unit.

FIG. 8 is a flowchart illustrating the drive sound generation processing of the robot 1 when the configuration illustrated in FIG. 6 is employed as the configuration of the drive sound generation unit 153. In step S11, as described above, a drive sound of each axis of the robot 1 is recorded, using the actual robot 1 while appropriately changing motion speed and acceleration of the robot 1, a posture of the robot 1, a wrist unit load, and the like. As described above, the relationship extraction unit 154 calculates, using the recorded drive sounds (the drive sound database 160), a relationship between predetermined parameters (torque of a motor, rotational speed of the motor, torque of a speed reducer, and rotational speed of the speed reducer) and a drive sound with respect to each axis.

Next, in step S12, the following processing is performed. The motion simulation execution unit 151 starts a motion simulation of the robot 1 in accordance with a motion program in response to a predetermined operation. On this occasion, the drive sound simulation unit 155 acquires torque of a motor, rotational speed of the motor, torque of a speed reducer, and rotational speed of the speed reducer with respect to each axis of the robot 1 in the current motion simulation as a motion state from the motion simulation execution unit 151 and, by inputting the parameters to the learning unit 156 (learning model), acquires a drive sound (a sound pressure level for each frequency component) corresponding to the parameters with respect to each axis. The drive sound simulation unit synthesizes sound pressure levels for respective frequency components acquired with respect to each axis with one another and thereby generates a drive sound of the robot 1. The generated drive sound is output via the speaker 62.

Another data structure example relating to the drive sound database will be described below. In the above-described example, the drive sound database 160 is configured as data in which parameters including torque and rotational speed of a motor and torque and rotational speed of a speed reducer are associated with a drive sound with respect to each axis of the robot 1. An example in which a drive sound corresponding to torque and rotational speed of a motor alone and a drive sound corresponding to torque and rotational speed of a speed reducer alone are put into a database as separate data with respect to each axis of the robot 1 will be described below.

First, the drive sound database 160 is prepared by driving the actual robot 1. Further, drive sound of a motor alone when torque and rotational speed of the motor is changed is separately measured and put into a database. For the measurement, it is preferable to use the motor alone and perform measurement using a sound recording environment in which sound other than a sound from the motor alone is prevented from being mixed. A drive sound relating to a speed reducer alone is extracted with respect to each axis by subtracting a drive sound of the motor alone of the axis from a drive sound of the axis that is prepared in the drive sound database 160.

Figure 9A:
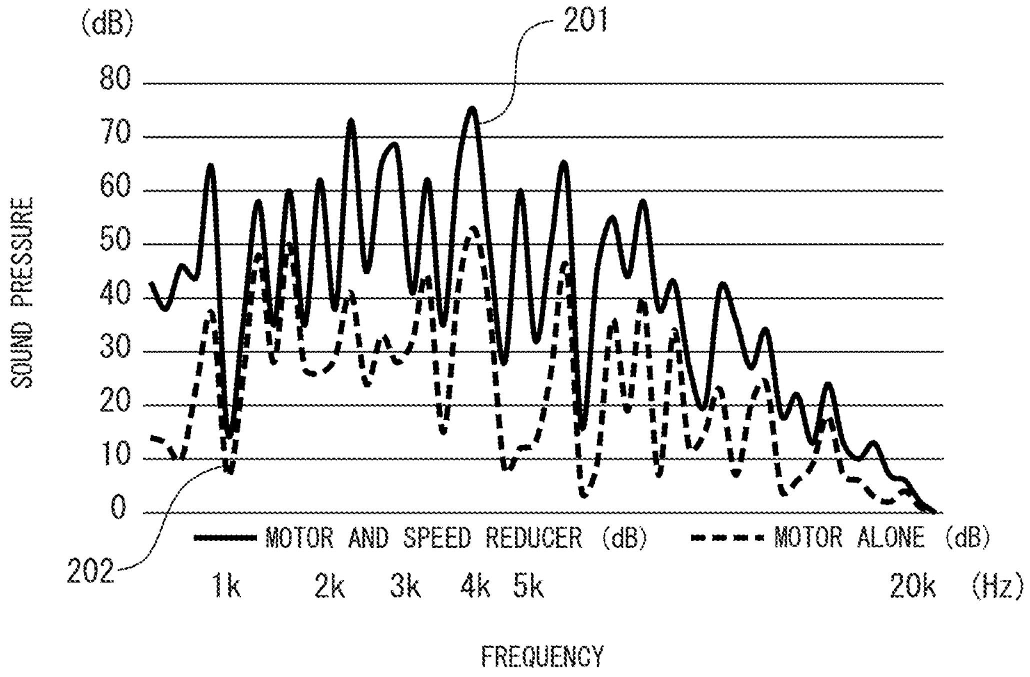
FIG. 9A is a graph illustrating an example of a drive sound of an axis of the robot and a drive sound of a motor alone of the axis.

The calculation of subtracting a drive sound of a motor alone from a drive sound of each axis is, for example, performed in the following manner. First, frequency analysis is performed on a drive sound when an axis of the actual robot 1 is caused to move (i.e., a drive sound including a motor drive sound and a speed reducer drive sound), using a method such as Fourier transformation, and data in the frequency domain are acquired. A graph 201 illustrated by a solid line in FIG. 9A is an example represents data in the frequency domain (frequency characteristic) of a drive sound of the axis. Next, frequency analysis is performed on a drive sound of a motor alone constituting the axis and data in the frequency domain are acquired. A graph 202 illustrated by a dashed line in FIG. 9A is an example represents data in the frequency domain (frequency characteristic) of a drive sound of the motor alone.

Figure 9B:
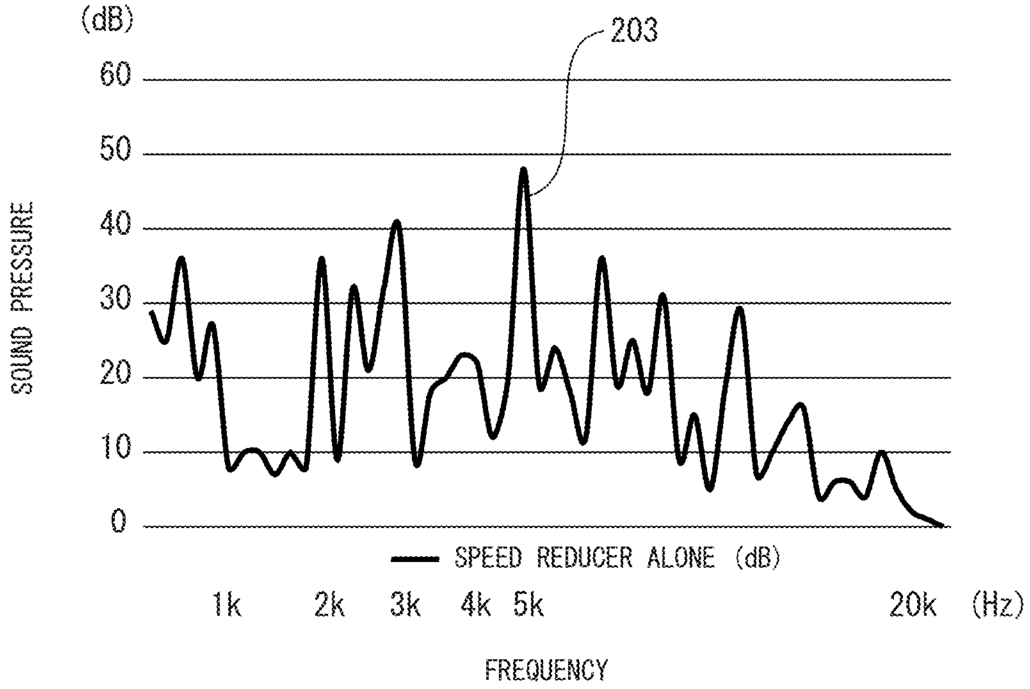
FIG. 9B is a graph illustrating an example of a drive sound of a speed reducer alone.

By subtracting the drive sound data represented by the graph 202 from the drive sound data represented by the graph 201, a graph 203 as illustrated in FIG. 9B is acquired as an example. The graph 203 is data in the frequency domain (frequency characteristic) of a drive sound of the speed reducer alone with respect to the axis. For example, by applying inverse Fourier transform to the data in the frequency domain represented by the graph 203, drive sound data in the time domain of the speed reducer alone constituting the axis can be acquired.

Figure 10:
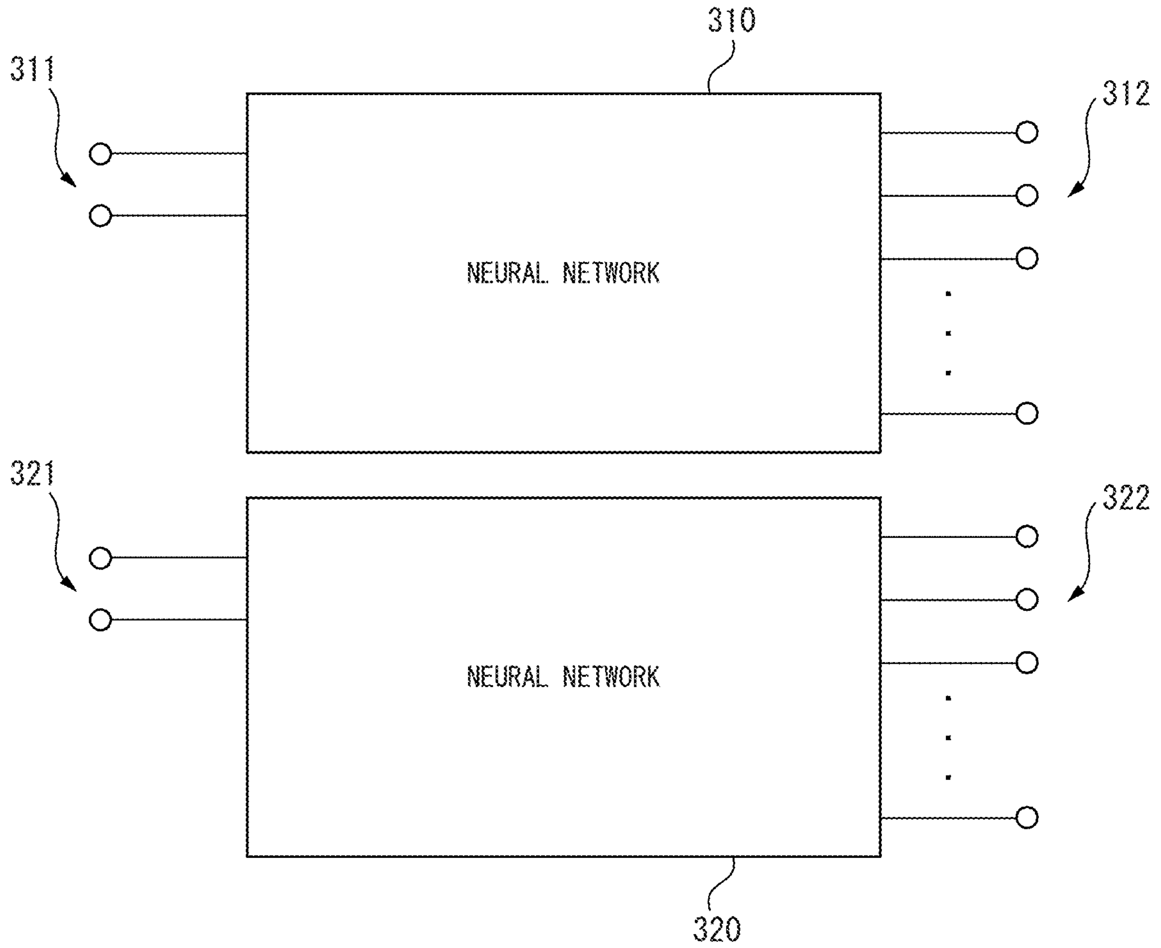
FIG. 10 is a diagram illustrating another configuration example of the learning unit.

With the above-described operation, each of a drive sound of a motor alone when the torque and rotational speed of the motor are changed as parameters and a drive sound of a speed reducer alone when the torque and rotational speed of the speed reducer are changed as parameters can be put into a database. When such a database is constructed, the relationship extraction unit 154 calculates each of a relationship between torque and rotational speed of a motor and a drive sound of the motor alone (a first relationship) and a relationship between torque and rotational speed of a speed reducer and a drive sound of the speed reducer alone (a second relationship). Specifically, in this case, the learning unit 156 is assumed to have a configuration including two neural networks 310 and 320 to perform learning with respect to a drive sound of a motor alone and a drive sound of a speed reducer alone, respectively. It should be noted that although in FIG. 10, two neural networks are illustrated for the convenience of description, a set of the two neural networks is prepared for each axis.

With regard to the neural network 310, a plurality of pieces of training data each including torque and rotational speed of a motor as input data and sound pressure for each frequency component of a drive sound of the motor alone at the torque and rotational speed as output data are prepared, and the neural network 310 is trained with the plurality of pieces of training data. Through this operation, the neural network 310 constructs a learning model that represents a relationship between torque and rotational speed of a motor and a drive sound of the motor alone. With regard to the neural network 320, a plurality of pieces of training data each including torque and rotational speed of a speed reducer as input data and sound pressure for each frequency component of a drive sound of the speed reducer alone at the torque and rotational speed as output data are prepared, and the neural network 320 is trained with the plurality of pieces of training data. Through this operation, the neural network 320 constructs a learning model that represents a relationship between torque and rotational speed of a speed reducer and a drive sound of the speed reducer alone.

During execution of motion simulation of the robot 1, the drive sound simulation unit 155 acquires a motion state of the robot 1, i.e., torque and rotational speed of a motor and torque and rotational speed of a speed reducer, and a drive sound of the motor alone and a drive sound of the speed reducer alone corresponding to the parameters from the database acquired as described above. The drive sound simulation unit 155, by inputting the acquired torque and rotational speed of the motor to the neural network 310, acquires a sound pressure level for each frequency component of a drive sound of the motor alone corresponding to the torque and rotational speed. The drive sound simulation unit 155 executes generation of a drive sound of the motor alone as described above with respect to each axis. The drive sound simulation unit 155, by inputting the acquired torque and rotational speed of the speed reducer to the neural network 320, acquires a sound pressure level for each frequency component of a drive sound of the speed reducer alone corresponding to the torque and rotational speed. The drive sound simulation unit 155 executes generation of a drive sound of the speed reducer alone as described above with respect to each axis.

The drive sound simulation unit 155, by synthesizing sound pressure for each frequency component that is acquired as sound pressure corresponding to torque and rotational speed of a motor with respect to all the axes, calculates a drive sound of the robot 1 relating to the motors. The drive sound simulation unit 155, by synthesizing sound pressure for each frequency component that is acquired as sound pressure corresponding to torque and rotational speed of a speed reducer with respect to all the axes, also calculates a drive sound of the robot 1 relating to the speed reducers. Further, the drive sound simulation unit 155 generates a drive sound of the entire robot 1 by synthesizing the drive sound of the motors and the drive sound of the speed reducers that are acquired in the above-described manner.

It can be considered that having a configuration to derive a relationship between parameters representing a motion state and a drive sound separately for a motor alone and a speed reducer alone as described above enables a more accurate relationship to be derived and reproducibility of a drive sound of the entire robot 1 to be improved.

According to the above-described embodiment, it becomes possible to generate a drive sound matching a motion state of a robot, time taken for confirmation work in a scene in which whether a motion of the robot performed by a program taught by an operator who is proficient in teaching operations to the actual robot is good or bad is determined is largely reduced, and the load on an operator also reduced.

Although the present invention has been described above using a typical embodiment, a person skilled in the art would understand that changes and other various modifications, omissions, and additions can be made to the embodiment described above without departing from the scope of the present invention.

Although in the above-described embodiment, a configuration in which the drive sound generation unit 153 uses the relationship extraction unit 154 has been described as one of specific configuration examples of the drive sound generation unit 153, the drive sound generation unit 153 may be configured as follows when a configuration in which the relationship extraction unit 154 is not used is employed. For example, the drive sound generation unit 153 may be configured to, when a drive sound that exactly coincides with parameters (torque and rotational speed of motors and torque and rotational speed of speed reducers) representing a motion state of the robot 1 under motion simulation exists in the drive sound database 160, use the drive sound acquirable from the drive sound database 160 and, when no drive sound that exactly coincides with the parameters exists in the drive sound database 160, acquire a drive sound corresponding to parameters close to the parameters.

The system configuration example illustrated in FIGS. 1, 3, 6, and the like is only an example, and the system configuration can be modified in various ways. For example, recording of a drive sound may be performed using a sound recording device separate from the robot simulation device. In this case, the robot simulation device may be configured to receive a drive sound or a drive sound database from the sound recording device.

When a drive sound of an actual robot is to be collected, it may be configured to collect a drive sound while changing at least one of speed, acceleration, a posture, and a wrist load of the robot.

It may be configured to use at least one of torque of a motor, rotational speed of the motor, torque of a speed reducer, and rotational speed of the speed reducer as a parameter representing a motion state of a robot. It may also be configured to further use a parameter other than the above-described parameter.

It should be noted that the robot controller 70 may have a configuration as a general computer that includes a CPU, a ROM, a RAM, a storage device, an operation unit, a display unit, an input/output interface, a network interface, and the like.

The functional blocks of the robot simulation device illustrated in FIGS. 3 and 6 may be achieved by a processor of the robot simulation device executing various types of software stored in the storage device or may be achieved by a configuration in which hardware, such as an application specific integrated circuit (ASIC), is mainly used.

Programs that execute various types of processing, such as the drive sound generation processing, in the above-described embodiment can be recorded in various types of computer-readable recording media (for example, a semiconductor memory, such as a ROM, an EEPROM, and a flash memory, a magnetic recording medium, and an optical disk, such as a CD-ROM and a DVD-ROM).

REFERENCE SIGNS LIST

1 Robot
11 Turning unit
12*a*, 12*b* Arm
13 Joint unit
14 Motor
16 Wrist unit
17 Work tool
19 Base unit
20 Mounting surface
50 Robot simulation device
51 Processor
52 Memory
53 Display unit
54 Operation unit
55 Storage device
56 Input/output interface
57 Sound input/output interface
61 Microphone
62 Speaker
70 Robot controller
151 Motion simulation execution unit
152 Sound recording unit
153 Drive sound generation unit
154 Relationship extraction unit
155 Drive sound simulation unit
156 Learning unit
160 Drive sound database
170 Motion program
300, 310, 320 Neural network

The invention claimed is:

1. A robot simulation device, comprising:
a processor configured to:
execute a motion simulation of a robot in accordance with a motion program; and
simulate and generate, based on drive sound data that are acquired by recording a drive sound of an actual robot, a drive sound of the robot matching a motion state of the robot in the motion simulation, wherein
the drive sound data have a structure in which a predetermined parameter relating to the motion state and the drive sound of the robot corresponding to the predetermined parameter are associated with each other, and
the processor is further configured to:
extract, based on the drive sound data, a relationship between the predetermined parameter and the drive sound of the robot, and
simulate, based on the extracted relationship, the drive sound matching the predetermined parameter representing the motion state of the robot in the motion simulation.

2. The robot simulation device according to claim 1, wherein
the processor is further configured to
record the drive sound from the actual robot, and
generate the drive sound data.

3. The robot simulation device according to claim 2, wherein
the drive sound of the actual robot is collected while changing at least one of speed, acceleration, a posture, and a wrist load of the actual robot.

4. The robot simulation device according to claim 1, wherein
the processor is further configured to
learn the relationship by machine learning, and
construct a learning model representing the relationship.

5. The robot simulation device according to claim 4, wherein
the processor is further configured to learn and extract, as the relationship, a relation between the predetermined parameter and sound pressure for each frequency component that is acquired by dividing a characteristic in a frequency domain of the drive sound of the robot into a plurality of frequency components.

6. The robot simulation device according to claim 1, wherein
the robot is a multi-axis robot,
the drive sound data have a structure in which with respect to each axis constituting the robot, the predetermined parameter and the drive sound of the robot corresponding to the predetermined parameter are associated with each other,
the processor is further configured to
extract a relationship between the predetermined parameter and the drive sound of the robot with respect to each axis,
generate, based on the relationship, the drive sound of each axis of the robot matching the predetermined parameter representing the motion state of the robot under the motion simulation, and
synthesize the generated drive sound of each axis.

7. The robot simulation device according to claim 6, wherein
the predetermined parameter includes at least one of torque of a motor, rotational speed of the motor, torque of a speed reducer, and rotational speed of the speed reducer.

8. The robot simulation device according to claim 1, wherein
the robot is a multi-axis robot,
the predetermined parameter includes a first predetermined parameter relating to a motor of the robot and a second predetermined parameter relating to a speed reducer of the robot,
the drive sound data have a structure in which with respect to each axis constituting the robot,
the first predetermined parameter and a drive sound of the motor alone corresponding to the first predetermined parameter are associated with each other, and
the second predetermined parameter and a drive sound of the speed reducer alone corresponding to the second predetermined parameter are associated with each other,
the processor is configured to
extract a first relationship between the first predetermined parameter and the drive sound of the motor alone,
extract a second relationship between the second predetermined parameter and the drive sound of the speed reducer alone, generate, based on the first relationship and the second relationship, the drive sound of the motor alone and the drive sound of the speed reducer alone corresponding to the first predetermined parameter and the second predetermined parameter representing the motion state of the robot under the motion simulation, respectively, and synthesize the generated drive sound of the motor alone and drive sound of the speed reducer alone with respect to each axis.

9. The robot simulation device according to claim 8, wherein the first predetermined parameter includes at least one of torque and rotational speed of the motor, and the second predetermined parameter includes at least one of torque and rotational speed of the speed reducer.

* * * * *